United States Patent [19]

de Lautrec et al.

[11] 4,120,816

[45] Oct. 17, 1978

[54] DEFOAMING APPARATUS

[75] Inventors: Jacques de Lautrec; Jean-Francois Coste, both of Saint Gaudens, France

[73] Assignee: Societe Nationale Elf Aquitaine (Production), Courbevoie, France

[21] Appl. No.: 821,512

[22] Filed: Aug. 3, 1977

[30] Foreign Application Priority Data

Aug. 6, 1976 [FR] France .................. 76 24069

[51] Int. Cl.² .................. B01D 19/00
[52] U.S. Cl. .................. 252/361; 159/DIG. 4
[58] Field of Search .......... 203/20; 252/361; 159/DIG. 4; 202/264; 55/178, 87, 36, 41

[56] References Cited

U.S. PATENT DOCUMENTS

| | | | |
|---|---|---|---|
| 2,471,571 | 5/1949 | Kimmell | 55/178 |
| 2,690,432 | 9/1954 | Herder | 252/361 |
| 3,335,549 | 8/1967 | Hendrix | 55/178 |
| 3,501,414 | 3/1970 | Müeller | 252/361 |
| 3,616,260 | 10/1971 | Muller | 55/178 |
| 3,693,325 | 9/1972 | Muller | 252/361 |

*Primary Examiner*—Hiram H. Bernstein
*Attorney, Agent, or Firm*—Burgess, Ryan and Wayne

[57] ABSTRACT

A defoaming apparatus comprising a column having three levels, a lower level, an intermediate level, and an upper level. The foam to be broken is injected into the lower level with mud. A shaft in the intermediate level serves as an aspirator. Air or another gas is injected into the shaft and the vacuum thus produced pulls the foam upwardly. The foam is discharged from the shaft against vanes located in the upper level where upon the foam is broken into gas which is discharged and liquid which is recovered. Sediment from the foam is drawn off at the bottom of the apparatus.

7 Claims, 1 Drawing Figure

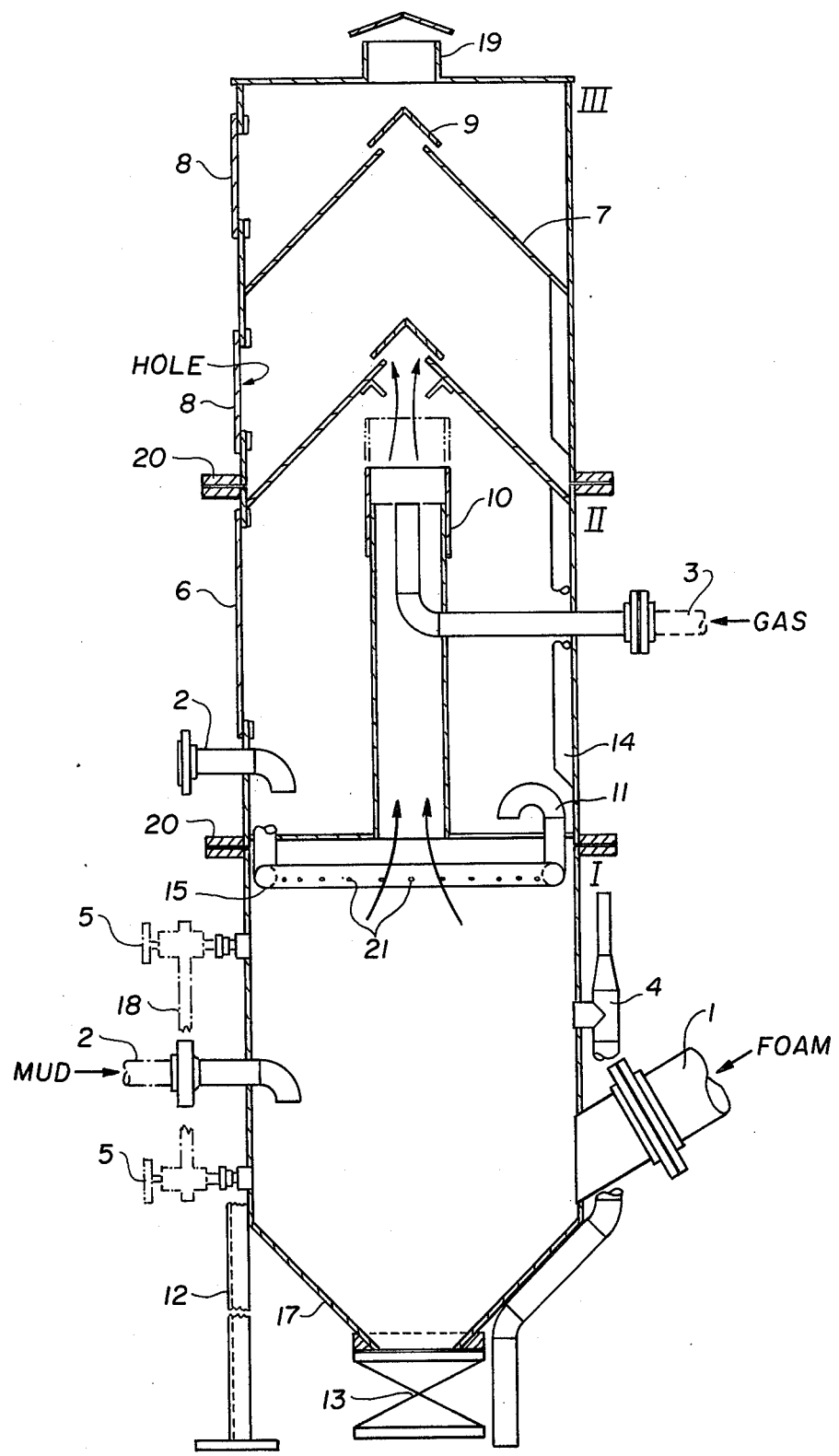

DEFOAMING APPARATUS

BACKGROUND OF THE INVENTION

This invention relates to a defoaming apparatus.

In various fields such as water treatment and some chemical industries there is a problem of disposing of foamed liquids. The problem is most severe, however, in the oil drilling industry where foams are commonly used when the geological strata support a relatively small pressure gradient and circulation of conventional drilling fluids would result in total loss of the fluids. Foaming agents are thus used to raise the liquids accumulated in the gas deposits. Likewise, the drilling, completion, and work-over of depleted oil reservoirs located in areas of great altitude or under a great depth of water need the use of fluids of specific weight ranging from 0.10 to 0.80 such as aerated muds or foams.

The foams are made from surface active materials and other additives such as stabilizers. They are propelled by pumps and gases under pressure and are immediately injected.

Back on the surface, these foams cannot be handled by the pumps. Consequently, in order to re-use the liquid and the gas, it is necessary to break the emulsion. Demulsifying products are costly and generally not very effective. Storage of the foams and the natural destruction thereof is a long, polluting, burdensome and uneconomical operation. In addition, when drilling in sedimentary strata, the gas used for the preparation of the foams is generally air. When the rock formation traversed contains signs of hydrocarbons, the air that is a constituent of the foam becomes charged with gaseous hydrocarbons and can become an explosive mixture. The risk of using an explosive mixture in the hole can be lessened by using methane for the preparation of the foam. But, above ground storage of the mixture is dangerous and, when the foam is destroyed, a gaseous mixture is released that could be explosive.

SUMMARY OF THE INVENTION

The instant invention makes it possible to overcome these various inconveniences by means of an apparatus capable of separating the solid rubbish and mechanically breaking the foam from the moment it leaves the pit with recovery of the foaming agents that can be used again, the percentage of hydrocarbons of the offgas being less than the limit of flammability.

It is, therefore, a primary object of the present invention to provide an apparatus for breaking the foam due to the emulsion of a gas in a liquid.

It is a further object of the present invention to provide an apparatus for destroying the foam used for drilling fluids.

Consistent with these objects, the apparatus generally is a column having three levels or zones. Mud is injected into the lower level while, at the same time, injecting the foam into the lower level. This brings about the coalescence of the air or gas bubbles and a separation of the sediment which is rubbish and other undesirable solid material. In the intermediate level or zone, air or gas is injected to produce a partial vacuum in a coaxial shaft thereby drawing the foam upwardly into the shaft and conveying it toward the top of the column. In the upper level or zone, the stream of foam strikes vanes and breaks into the constituent gas and liquid. The liquid is returned to the intermediate level to be recovered and the gas is drawn off at the top of the apparatus. The refuse is drawn off at the bottom of the apparatus.

DESCRIPTION OF THE PREFERRED EMBODIMENT

The preferred embodiment of the instant inventive apparatus is depicted in vertical section in the sole FIGURE of the drawing. The defoaming apparatus of the present invention generally comprises a column of circular or square section. The column is preferably a cylindrical column. The column comprises three levels or zones, a lower level, an intermediate level, and an upper level, generally designated in the drawing by the numerals I, II, and III, respectively. At the bottom of the lower level is a frusto-conical bottom section 17 essentially acting as a funnel. The column can be fabricated of any suitable material such as cast iron, stainless steel, or any other material capable of tolerating pressures as high as 5 kg/cm$^2$ and corrosion caused by oxygen.

The foam charged with rubbish is injected into the lower level I through conduit means 1 the access of which preferably forms a 60° angle with the vertical axis of the column. In order to produce a coalescence of the gas bubbles and a sedimentation of the rubbish, mud is injected through conduit means 2 located in the wall of the lower section of the column diametrically opposite the location of conduit 1. The lower level is filled with mud charged with foaming agent until it is completely full as shown by an overflow stack 4. The level of the material in the lower section of the column can be followed by the outside through tubular level 5 with viewing glass tube 18.

The rubbish descends to the bottom of the funnel 17 as sediment and is eliminated through the same by means of a gate valve having a clamp diaphragm 13. The opening of the gate valve is manually or automatically regulated in such a manner that all the rubbish is eliminated while maintaining a level of mud and foaming agent to the point of overflow. In order to maintain this level, it is possible to adjust the flow of mud being injected so that it does not exceed 30% of the flow of the aqueous solution used for the preparation of the foam.

The intermediate level zone II is joined to the lower level of zone I by a system of cross bars or flanges 20. An air or gas inlet 3 injects the air or gas at low pressure but high flow into coaxial shaft 10 which is disposed vertically within the column and coaxial therewith. It will be seen that conduit 3 has a right-angle bend so that the air or gas discharged from the same will also be coaxial with the column. The shaft 10 is of adjustable height to allow for varying levels of air or gas injection conduit.

The gas injected into shaft 10 by means of conduit 3 creates a partial vacuum in shaft 10 so that foam from lower section I is drawn upwardly therein and is discharged at the upper end of shaft 10 which is located in the upper level or zone III.

The upper level is provided with a plurality of vanes 7, preferably at least four vanes 7, inclined at an angle of 45° in relation to the horizontal. Pairs of vanes 7 are disposed diametrically opposite each other and covered by a conical cap 9 having at the top an angle of 90°. The ratio of the generatrix and of the cone to the length of the vanes is about 0.7. The vanes are fabricated of stainless steel plates coated with polytetrafluoroethylene, for example in order to facilitate the breaking of the gas or air bubbles as will be described below. The vanes 7 are attached to the column by bolting, welding, or any other suitable means. Several series of vanes can be superposed.

The foam drawn up through shaft 10 and discharged therefrom is thrown against the vanes 7. The shock of the foam striking vanes 7 causes the gas bubbles to break. The gas is then discharged through the upper portion of the column, by means of vent 19. The liquid phase flows through conduit 14 downwardly into the intermediate level II and the collected liquid is evacuated by curved conduits 11 that discharge in the lower level in the form of with perforations 21 tubes 15. Thus, the liquid is showered on the surface of the foam located in the lower level.

The three levels of the column are of substantially the same height and are joined by crossbar devices or flanges 20 using any suitable joining means.

The diameter of the shaft 10 is approximately equal to one fifth of the diameter of the column.

A second mud inlet 2 may be provided in the intermediate level and an inspection port 6 may also be provided. Punched holes 8 in the wall of the upper level are provided between each series of vanes.

The gas injected through conduit 3 is usually air supplied from a blower. There can be advantageously added, or even substituted, exhaust gas from engines and, especially, engines that drive the compressors used for the preparation of the foam. Thus, cost of operating the process is reduced. Similarly, the oxygen content of the gas is reduced thereby reducing the flammability of the mixture if it should contain hydrocarbons.

The defoaming apparatus of this invention can be used in different chemical or food industries where considerable residual foams are produced. Water treatment plants can especially utilize this invention.

What is claimed is:

1. A defoaming apparatus comprising a vertical cylindrical column having a lower level containing foam to be broken, an intermediate level, and an upper level; a frusto-conical bottom section into which said lower level communicates; conduit means for charging foam mixed with rubbish to said lower level; conduit means for charging mud to said lower level; valve means at the bottom of said bottom section to regulate the discharge of sediment therefrom, at a rate controlled, in conjunction with the feeding of mud and foam, to maintain said lower level filled with mud and foam; means for injecting gas at low pressure and high flow into a vertical shaft of adjustable height located in said intermediate level and coaxial with said column, said shaft being open at each end, a plurality of superposed pairs of inclined vanes located in said upper level, and covered by a conical cap; whereby when gas is injected into said shaft a partial vacuum is created and the foam is drawn up into the shaft and discharged into said against said vanes; means for recovering liquid from the foam that breaks when driven against said vanes and spraying same over the surface of the foam in said lower level; and means for removing the gas released from said foam.

2. An apparatus according to claim 1, wherein said means for charging foam is disposed at an angle of 60° with respect to the vertical.

3. An apparatus according to claim 1, further comprising means for regulating the flow of mud to be less than 30 % of the flow of the aqueous solution used to prepare the foam.

4. An apparatus according to claim 3, further comprising means to regulate said valve means responsive to the flow of mud.

5. An apparatus as claimed in claim 1, wherein said three levels are of substantially equal height and the ratio of the diameter of said shaft to the diameter of said column is about 1:5.

6. An apparatus as claimed in claim 1, wherein said vanes form an angle of 45° with the horizontal, said conical cap has an angle of 90° at the top, and the generatrix of the cone in relation to the length of the vanes is about 0.7.

7. An apparatus as claimed in claim 1, wherein said vanes are coated with polytetrafluoroethylene.

* * * * *

UNITED STATES PATENT OFFICE
CERTIFICATE OF CORRECTION

Patent No. 4,120,816     Dated October 17, 1978

Inventor(s) Jacques de Lautrec, et al

It is certified that error appears in the above-identified patent and that said Letters Patent are hereby corrected as shown below:

Column 1, last line: "guid" should be --quid--

Column 3, line 13: "with perforations 21 tubes 15" should be --tubes 15 with perforations 21--

Column 4, line 14: "into said" should be cancelled.

Signed and Sealed this

Tenth Day of July 1979

[SEAL]

Attest:

LUTRELLE F. PARKER
Attesting Officer    Acting Commissioner of Patents and Trademarks